United States Patent [19]
Meyer et al.

[11] Patent Number: 6,150,917
[45] Date of Patent: Nov. 21, 2000

[54] PIEZORESISTIVE SENSOR BRIDGE HAVING OVERLAPPING DIFFUSED REGIONS TO ACCOMMODATE MASK MISALIGNMENT AND METHOD

[75] Inventors: Brian D. Meyer, Scottsdale; Ira E. Baskett, Tempe, both of Ariz.

[73] Assignee: Motorola, Inc., Schaumburg, Ill.

[21] Appl. No.: 08/395,228

[22] Filed: Feb. 27, 1995

[51] Int. Cl.$^7$ ...................................................... G01L 1/22
[52] U.S. Cl. ........................ 338/4; 338/42; 29/621; 29/621.1
[58] Field of Search ........................ 338/2, 4, 42, 325, 338/327; 73/721; 29/621, 621.1

[56] References Cited

U.S. PATENT DOCUMENTS

| | | | |
|---|---|---|---|
| 3,270,554 | 9/1966 | Pfann | 338/2 |
| 3,701,056 | 10/1972 | Ozawa et al. | 333/130 |
| 3,916,365 | 10/1975 | Giachino | 338/2 |
| 4,315,236 | 2/1982 | Tominaga et al. | 338/4 |
| 4,620,365 | 11/1986 | Burger et al. | 29/620 |
| 4,869,107 | 9/1989 | Murakami | 73/514.33 |
| 5,198,794 | 3/1993 | Sato et al. | 338/195 |

FOREIGN PATENT DOCUMENTS

| | | | |
|---|---|---|---|
| 2724817 | 12/1978 | Germany | 29/621.1 |
| 0058367 | 4/1982 | Japan | 29/621.1 |

Primary Examiner—Karl D. Easthom
Attorney, Agent, or Firm—A. Kate Huffman

[57] ABSTRACT

A piezoresistive pressure sensor (30) has four resistive diffused regions (32) coupled into a bridge configuration (33) with four junctions (36) and four inside corners (40). Each of the diffused regions has a first end connected to one of the four junctions and a second end connected to a different one of the four junctions. There are four contact diffusion terminals (34) disposed in contact with the bridge configuration, and each of the diffusion terminals is disposed at one of the four junctions such that the diffused regions are electrically connected essentially only by the contact diffusion terminals and an overlap (44, 46) is provided between each of the diffusion terminals and the inside corners to accommodate mask misalignment during manufacture. Thus, no tap is required to electrically connect the contact diffusion terminals to the resistive diffused regions of the bridge, which results in increased sensor sensitivity.

19 Claims, 2 Drawing Sheets

6,150,917

PIEZORESISTIVE SENSOR BRIDGE HAVING OVERLAPPING DIFFUSED REGIONS TO ACCOMMODATE MASK MISALIGNMENT AND METHOD

BACKGROUND OF THE INVENTION

The present invention relates, in general, to electrical transducers and, more particularly, to piezoresistive transducers.

Piezoresistive pressure sensors are in widespread use and typically have a transducer with a piezoresistive element disposed on a thin diaphragm, which flexes in response to pressure changes and thus causes a resistance change across the transducer. This resistance change is measured to determine the corresponding pressure acting on the sensor.

One particular prior sensor has a pressure sensor disposed on a thin diaphragm that has been formed from a silicon substrate. The resistive regions of the sensor are formed in the diaphragm region of the silicon substrate by diffusion to provide an electrical bridge. An electrical difference is sensed across this bridge to determine the pressure applied thereto. A problem with this prior sensor, however, is that the bridge requires lead-in taps which add some common resistance to each half of the bridge and to its differential sensing taps. This additional resistance lowers the sensitivity of the pressure sensor (i.e. reduces its span) and increases its susceptibility to mask misalignments. One adverse effect of such misalignment is an offset shift in the transducer's output. Accordingly, it is desirable to have a pressure sensor that has increased sensitivity and improved tolerance to slight mask misalignment during manufacture.

DETAILED DESCRIPTION OF THE DRAWINGS

Figure 1:
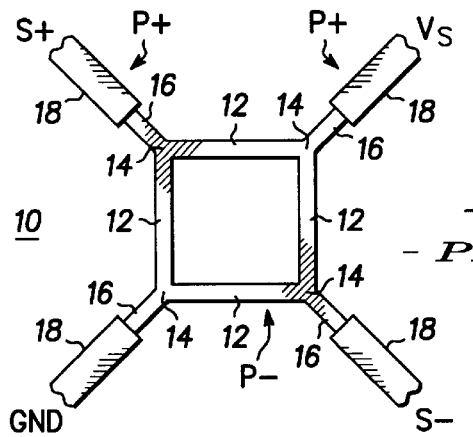
FIG. 1 is a layout view of a prior pressure sensor.

FIG. 1 illustrates the physical structure, in a top layout view, of a transducer 10 for a prior pressure sensor. Transducer 10 is formed on a thin diaphragm that has been machined from a silicon substrate (not shown), and transducer 10 has four resistive legs 12 connected in a bridge configuration. Legs 12 are joined together at junctions 14, and taps 16 are provided at each of junctions 14 for connecting transducer 10 to sensing circuitry (not shown). It should be noted that taps 16 are formed from the same diffusion region as resistive legs 12. Both resistive legs 12 and taps 16 are lightly-doped, and taps 16 are connected to heavily-doped contact terminals 18, which are also diffused in the silicon substrate. Terminals 18 are typically connected to aluminum interconnect lines (not shown).

Figure 2:
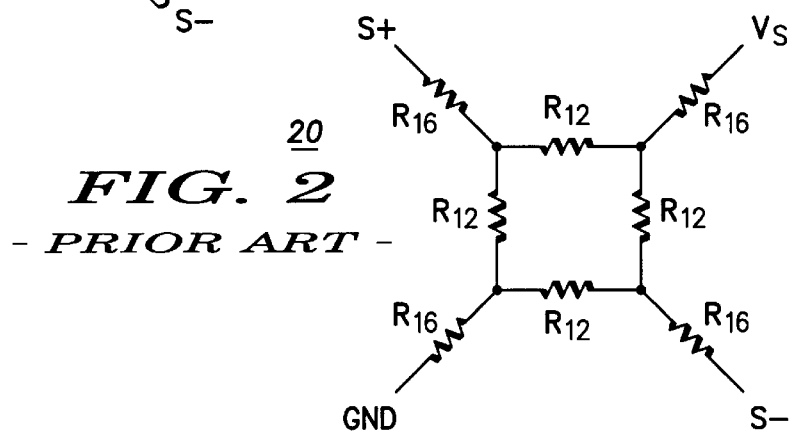
FIG. 2 is an electrical schematic corresponding to the sensor of FIG. 1.

Referring to FIG. 2, an electrical schematic illustrates a bridge 20 comprised of a plurality of resistors $R_{12}$ and $R_{16}$. Resistors $R_{12}$ correspond to resistive legs 12 of transducer 10, and resistors $R_{16}$ correspond to taps 16 thereof. In operation, a voltage is applied across terminals GND and $V_S$, and a voltage difference is sensed across terminals S+ and S−. A disadvantage of the structure of transducer 10 is that resistors $R_{16}$, being in series with bridge resistors $R_{12}$, reduce the voltage drop that can be achieved across bridge 20 for any given voltage level applied across terminals GND and $V_S$. In other words, the presence of resistors $R_{16}$ creates a common resistance to both sides of bridge 20, which results in an undesirable common mode signal.

The presence of this common mode signal decreases the sensitivity of transducer 10 relative to that which could be obtained if resistors $R_{16}$ were absent. Furthermore, the presence of resistors $R_{16}$ at sensing terminals S+ and S− results in an offset error whenever there is a small misalignment of the two masks used to form resistors 12 and terminals 18.

In contrast to prior transducer 10 above, and according to the present invention, a new transducer structure is provided which eliminates the adverse effects of the common resistances and common mode signal discussed above. Briefly stated, the present invention provides, in one specific embodiment, a piezoresistive sensor having four resistive diffused regions coupled into a bridge configuration with four junctions. Each of the diffused regions has a first end connected to one of the four junctions and a second end connected to a different one of the four junctions. There are four contact diffusion terminals disposed in contact with the bridge configuration, and each of the diffusion terminals is disposed at one of the four junctions such that the diffused regions are electrically connected essentially only by the contact diffusion terminals. In other words, no tap is required to electrically connect the contact diffusion terminals to the resistive diffused regions of the bridge configuration, and thus the common resistance represented by resistors $R_{16}$ of FIG. 2 is eliminated.

Figure 3:
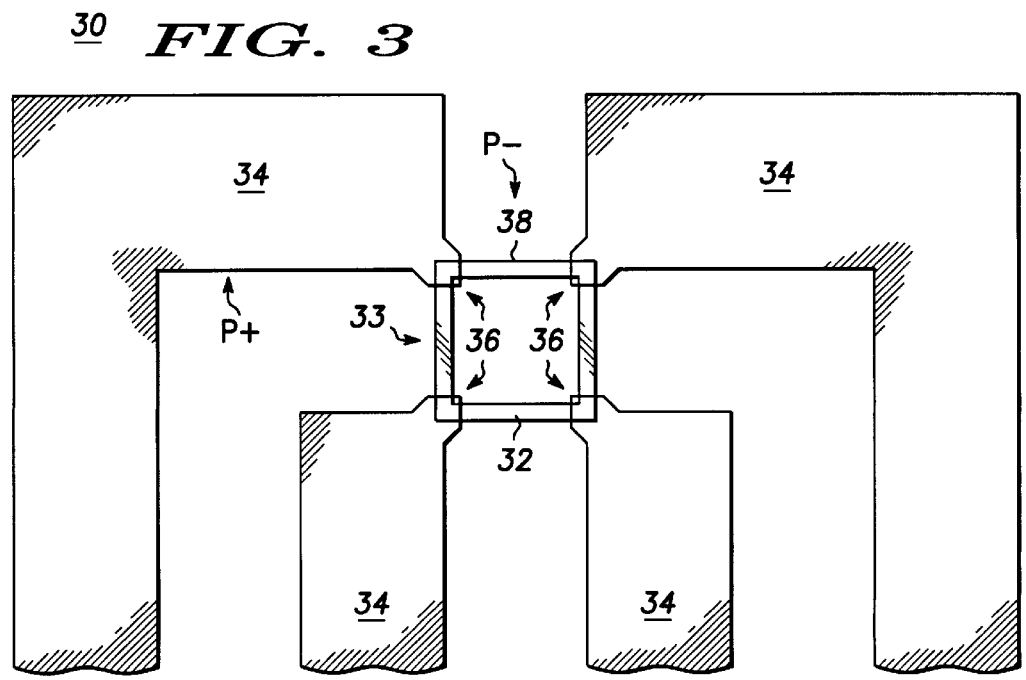
FIG. 3 is a top view of a pressure sensor according to the present invention.

The present invention can be more fully described with reference to FIGS. 3–6. FIG. 3 illustrates a plan view of a pressure sensor 30 according to one particular embodiment of the present invention. Sensor 30 generally comprises resistors 32 connected in a bridge configuration 33 by contact diffusion regions 34. More specifically, resistors 32 are typically formed by diffusion of, for example, a p-type dopant into the surface of a semiconductor substrate (not shown), such as silicon, using a conventional mask and dopant implant process. Resistors 32 are preferably lightly-doped to have a sheet resistance of, for example, about 300 ohms per square.

Contact regions 34 provide terminals for the operation of bridge configuration 33 corresponding to terminals GND, $V_S$, S+, and S− as shown in FIG. 2. Contact regions 34 are also typically formed by a conventional mask and dopant implant process to have a sheet resistance of, for example, about 4 ohms per square. As shown in FIG. 3, contact regions 34 electrically connect each of resistors 32 at junctions 36 of bridge configuration 33. According to the present invention, taps are not required to connect bridge configuration 33 to external sensing circuitry (not shown). Instead, contact regions 34 are disposed directly over the connection points of resistors 32 at junctions 36, as will be discussed in greater detail presently.

In one approach, sensor 30 may be formed by implanting an annular diffusion region 38 to a light dopant concentration in a first mask and implant step. Next, a second mask and implant step is performed to form contact diffusion regions 34 having a heavy dopant concentration. Either p-type or n-type dopants may be used, but p-type is preferred. The result of this processing is that annular diffusion region 38 is partitioned into four resistors 32 disposed about its circumference, which are connected by highly-conductive contact regions 34.

By way of example, resistors 32 may have a width of about 8 microns and a length of about 80 microns, though these dimensions can vary widely as will be recognized by one of skill in the art. Also, resistors 32 are shown here as being rectangular in shape. In other embodiments, curved or other shapes may also be used.

Figure 4:
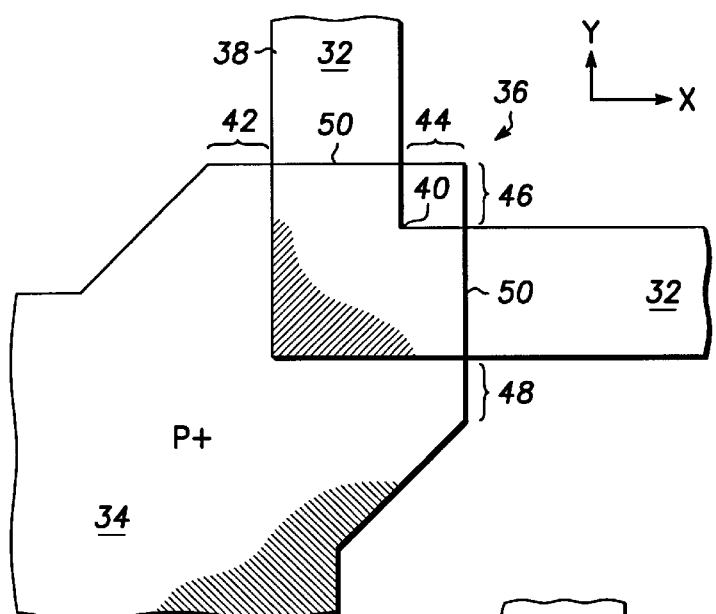
FIG. 4 is a detail view of a bridge junction of the sensor of FIG. 3.

FIG. 4 shows one of junctions 36 in greater detail. Specifically, after the formation of annular diffusion region 38 as discussed above, contact regions 34 are formed so that an inside corner 40 will be covered or overlapped by the heavy diffusion used to form contact regions 34. In this embodiment, overlaps 42, 44, 46, and 48 are provided so that sensor 30 is resistant to small mask misalignments, for example, of about 2–4 microns. As an example, overlap 42 may have a dimension of 2–4 microns. Overlaps 42 and 44 will avoid the adverse effects of misalignment in the x direction, and overlaps 46 and 48 will avoid these adverse effects in the y direction.

The formation of contact regions 34 partitions annular diffusion region 38 into resistors 32. In the manufacture of bridge configuration 33, resistors 32 are formed to have substantially identical resistances, and thus are more preferably formed to have substantially identical shapes. In this specific embodiment, an interface 50 between region 34 and resistor 32 is linear and orthogonal to the longitudinal axis of resistor 32. However, in other embodiments, the interface need not be linear.

Figure 5:
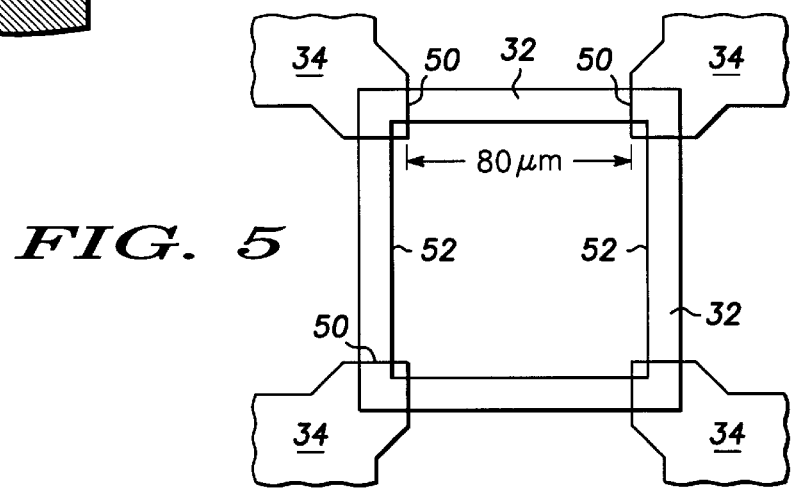
FIGS. 5 and 6 are top views illustrating the tolerance of the sensor of the present invention to mask misalignment.

Often during manufacture there is an inadvertent misalignment between the two masks used to form regions 34 and 38. An advantage of the present invention is that the manufactured length of resistors 32 will remain constant even in the presence of such misalignment. This is shown more specifically in FIGS. 5 and 6. FIG. 5 illustrates an ideal case in which there is no mask misalignment. Here, the length of each of resistors 32 is 80 microns measured from interfaces 50, and the distance from reference edges 52 to each respective interface 50 for the top resistor is equal in the horizontal direction.

Figure 6:
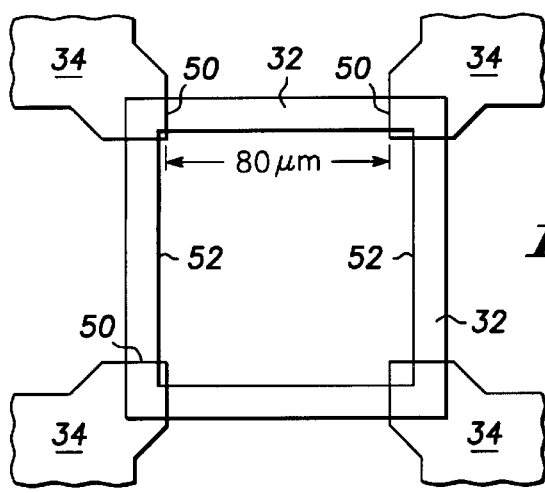

In contrast, FIG. 6 illustrates a case in which there is some mask misalignment. Although there is slight misalignment, because contact regions 34 are defined by the same mask, the length of resistor 32 remains constant. Overlaps 42, 44, 46, and 48 ensure that contact regions 34 provide a full overlap of inside corners 40 (see FIG. 4) for slight mask misalignment. In other words, there is still no electrical connection path of lightly-doped diffusion region connecting resistors 32 even when there is some misalignment.

By now, it should be appreciated that there has been provided a novel piezoresistive pressure sensor and method of manufacture thereof. The present invention improves the sensor's sensitivity by eliminating the common mode signal described above. Also, by providing an overlap of the contact region to the bridge resistors, the sensor exhibits tolerance to slight mask misalignments.

Although a particular embodiment has been described above, one of skill in the art will recognize that the present invention may also be used in, for example, strain gauges, accelerometers, or other transducers taking advantage of the piezoresistive effect of a diffused region in a semiconductor substrate.

What is claimed is:

1. A piezoresistive sensor comprising:
   a first diffusion resistor and a second diffusion resistor connected to provide an inside corner; and
   a diffusion terminal in contact with both said first diffusion resistor and said second diffusion resistor, wherein said first diffusion resistor and said second diffusion resistor are in conductive contact essentially only through said diffusion terminal and said diffusion terminal forms and overlap with said inside corner.

2. The sensor of claim 1 wherein said first diffusion resistor and said second diffusion resistor have a substantially identical layout shape.

3. The sensor of claim 2 wherein said shape is a rectangle.

4. The sensor of claim 1 wherein:
   said first diffusion resistor has a longitudinal axis and has an end that forms a substantially linear interface with said diffusion terminal; and
   said interface is substantially orthogonal to said longitudinal axis of said first diffusion resistor.

5. The sensor of claim 1 wherein said overlap is sufficient to permit a misalignment between said first diffusion resistor and said diffusion terminal of less than 2 microns.

6. The sensor of claim 1 wherein said sensor is disposed in a plane and said overlap provides a misalignment tolerance in first and second orthogonal directions in said plane.

7. The sensor of claim 1 wherein said overlap is disposed on first and second opposite sides of said first diffusion resistor.

8. The sensor of claim 1 wherein said diffusion terminal eliminates a common resistance path to said first diffusion resistor and said second diffusion resistor.

9. A sensor consisting essentially of four substantially identical piezoresistive diffusion resistors electrically coupled into a bridge configuration having four inside corners essentially only by four diffusion terminals and wherein each of said four diffusion terminals overlaps one of said four inside corners.

10. A piezoresistive sensor comprising:
    four diffused regions coupled into a bridge configuration having four inside corners, wherein each of said diffused regions has a first end connected to one of said four inside corners and has a second end connected to a different one of said four inside corners; and
    four contact diffusion terminals disposed in contact with said bridge configuration wherein each of said diffusion terminals is disposed to overlap one of said four inside corners such that said diffused regions are electrically connected essentially only by said contact diffusion terminals.

11. The sensor of claim 10 wherein an electrical resistance of each of said four diffused regions is insensitive to a small misalignment shift between a first mask defining said four diffused regions and a second mask defining said four contact diffusion terminals.

12. The sensor of claim 11 wherein said misalignment shift is less than about 4 microns.

13. The sensor of claim 10 wherein two of said four contact diffusion terminals correspond to differential sensing terminals.

14. A method of forming a piezoresistive sensor comprising the steps of:
    forming a continuous annular resistive diffusion region in a semiconductor substrate; and
    forming four contact regions in said semiconductor substrate and disposed symmetrically about a circumference of said resistive diffusion region wherein said resistive diffusion region is partitioned into four substantially identically-shaped resistive legs wherein said resistive diffusion region has four inside corners and each of said contact regions overlaps one of said inside corners.

15. The method of claim 14 wherein said annular resistive diffusion region is lightly-doped relative to said four contact regions.

16. The method of claim 15 wherein said annular resistive diffusion region and said four contact regions are doped with a p-type dopant.

17. The method of claim 14 wherein each of said resistive legs is substantially rectangular.

18. A piezoresistive pressure sensor comprising:

four diffusion resistor regions formed in a semiconductor substrate and disposed in a bridge configuration having four inside corners and having four junctions wherein a pair of said resistor regions are connected at each of said junctions and each of said resistor regions has a first dopant concentration; and four terminal contact diffusion regions wherein each of said contact diffusion regions is disposed at one of said four junctions, each of said contact diffusion regions has a second dopant concentration substantially greater than said first dopant concentration, and said resistor regions are electrically connected essentially only by said contact diffusion regions and wherein each of said contact diffusion regions overlaps one of said four inside corners.

19. The sensor of claim 18 wherein said contact diffusion regions physically isolate said resistor regions into four distinct regions corresponding essentially to said first dopant concentration.

* * * * *